United States Patent

Takada

[11] Patent Number: 5,846,892
[45] Date of Patent: Dec. 8, 1998

[54] CERAMIC DIELECTRICS AND METHODS FOR FORMING THE SAME

[75] Inventor: Takahiro Takada, Osaka, Japan

[73] Assignee: Sumitomo Metal Industries Ltd., Osaka, Japan

[21] Appl. No.: 628,643

[22] PCT Filed: Sep. 7, 1995

[86] PCT No.: PCT/JP95/01784

§ 371 Date: Jul. 24, 1996

§ 102(e) Date: Jul. 24, 1996

[87] PCT Pub. No.: WO96/08019

PCT Pub. Date: Mar. 14, 1996

[30] Foreign Application Priority Data

Sep. 7, 1994 [JP] Japan .................................. 6/213870
Aug. 22, 1995 [JP] Japan .................................. 7/213771

[51] Int. Cl.⁶ .................................................. C04B 35/46
[52] U.S. Cl. ............................................................ 501/136
[58] Field of Search ............................................. 501/136

[56] References Cited

U.S. PATENT DOCUMENTS 5,525,562  6/1996  Kagata et al. ........................... 501/136

FOREIGN PATENT DOCUMENTS 51-67999   6/1976   Japan .
56-54272   5/1981   Japan .
63-151655  12/1986  Japan .
3138615    6/1988   Japan ........................... C04B 35/46

*Primary Examiner*—Deborah Jones
*Attorney, Agent, or Firm*—Armstrong, Westerman, Hattori, McLeland & Naughton

[57] ABSTRACT

The present invention relates to a ceramic dielectrics. It is difficult to downsize a $MgTiO_2$-base ceramic composition conventionally used, having an insufficiently high relative dielectric constant ($\in_r$), less than 20, while a $CaTiO_3$-base ceramic composition, having a small value of Q, is not suitable for electronic devices processing a signal in the high-frequency-bandwidth. Moreover, it is difficult to control the temperature coefficient of resonant frequency of these conventional ceramic compositions. In the present invention, a ceramic dielectrics having a composition represented by $xMgTiO_3 \cdot (1-x)CaTiO_3 \cdot y(Ln^1_{1-w}Ln^2_w)_2Ti_{2z}O_{3+4z}$ (wherein $Ln^1$ and $Ln^2$ are lanthanoids, and w, x, y, and z are values in the ranges of $0 \leq w < 1$, $0.20 \leq x \leq 0.80$, $0.05 \leq y \leq 5.0$, and $0.25 \leq z \leq 1.5$, respectively) contributes to solving the above problems. The ceramic dielectrics according to the present invention can be used as a material for a resonator processing a signal in the microwave-bandwidth, a filter, a capacitor or the like.

10 Claims, 1 Drawing Sheet

CERAMIC DIELECTRICS AND METHODS FOR FORMING THE SAME

FIELD OF THE INVENTION

The present invention relates to a ceramic dielectrics and a method for forming the same.

DESCRIPTION OF THE PRIOR ART

Recently, ceramic dielectrics for high frequency signals have been widely utilized as a material for a resonator used in an antenna duplexer of radio communication equipments such as a mobile phone, a cellular phone and a cordless telephone, a voltage-controlled oscillator (VCO) etc., or a filter used in a tuner for CATV. By using a material having a high dielectric constant for these applications, the wave length of an electromagnetic wave can be shortened to the length of $\in_r^{-1/2}$ ($\in_r$: relative dielectric constant) under vacuum, so that one wave length, half a wave length or a quarter of a wave length, a resonant condition of an electromagnetic wave, can be shortened. Therefore, when the material is used, electronic devices which process electric signals using a resonance of an electromagnetic wave can be easily downsized.

Characteristics required for the ceramic dielectrics for high frequency signals are:

(1) Since the wave length of an electromagnetic wave is shortened to $\in_r^{-1/2}$ in dielectrics, among ceramic dielectrics having the same resonant frequency, those which have a higher dielectric constant can be more downsized. Thus, the dielectric constant should be as high as possible;

(2) The dielectric loss (1/Q) should be small in the high-frequency-bandwidth, that is, the value of Q should be large; and (3) The variation of a resonant frequency depending on a temperature variation should be small, that is, the dependency on temperature of the relative dielectric constant ($\in_r$) should be small.

Besides, a reference clock frequency of electronic devices has been chosen in the microwave-bandwidth in many cases, and at present, the clock frequency of electronic equipment for the consumer is 1 GHz or so. However, as an increase of information content delivered per unit time, and a controlling speed of electronic equipment and a processing speed of signals have become faster, electronic devices for a microwave which can be also used in a higher-frequency-bandwidth (several GHz) are becoming necessary. Accordingly, as a ceramic dielectrics constituting the electronic devices for a microwave, a material having a large value of Q is required to make a microwave loss as small as possible. In addition, a material having a high dielectric constant is required to make the electronic devices as small as possible.

Hitherto, as ceramic dielectrics having the above characteristics, a $MgTiO_3$-base and a $CaTiO_3$-base ceramic dielectrics have been known.

The conventional $MgTiO_3$-base ceramic dielectrics has a large value of Q, but has a relative dielectric constant ($\in_r$) of less than 20, which is not sufficiently high. As a result, it is difficult to downsize an element with the $MgTiO_3$-base ceramic dielectrics therein. On the other hand, the $CaTiO_3$-base ceramic dielectrics has a high dielectric constant, but has a small value of Q. As a result, it is not suitable for electronic devices processing signals in the high-frequency-bandwidth, and it is not suitable for being put to practical use because of its extremely high temperature coefficient of resonant frequency ($\tau_f$).

Moreover, since it is difficult to control the temperature coefficient of resonant frequency ($\tau_f$) without changing the composition of these materials, it is required to change the temperature coefficient of resonant frequency ($\tau_f$) by adding several kinds of additives such as rare earth elements to the above materials. But a ceramic dielectrics available for several requirements cannot be easily provided since the characteristics in changing compositions have not been systematically examined.

DISCLOSURE OF THE INVENTION

The present invention was achieved in order to solve these problems, and it is an object to provide a ceramic dielectrics having a larger value of Q and a higher relative dielectric constant ($\in_r$) than ever, whose temperature coefficient of resonant frequency ($\tau_f$) can be controlled to an optional value in the range of +100 to −100 ppm/°C., and a method for forming the same.

A ceramic dielectrics (1) according to the present invention have a composition represented by $xMgTiO_3 \cdot (1-x)CaTiO_3 \cdot y(Ln^1_{1-w}Ln^2_w)_2Ti_{2z}O_{3+4z}$ (wherein $Ln^1$ and $Ln^2$ are lanthanoids, and w, x, y, and z are values in the ranges of $0 \leq w < 1$, $0.20 \leq x \leq 0.80$, $0.05 \leq y \leq 5.0$ and $0.25 \leq z \leq 1.5$, respectively.).

A ceramic dielectrics (2) according to the present invention substantially comprise a composition as a principal component represented by $xMgTiO_3 \cdot (1-x)CaTiO_3 \cdot y(Ln^1_{1-w}Ln^2_w)_2Ti_{2z}O_{3+4z}$ (wherein $Ln^1$ and $Ln^2$ are lanthanoids, and w, x, y, and z are values in the ranges of $0 \leq w < 1$, $0.20 \leq x \leq 0.80$, $0.05 \leq y \leq 5.0$ and $0.25 \leq z \leq 1.5$, respectively.) and ZnO and/or MnO as additives in the range of a mol (where, $0 < a \leq 0.2$) to 1 mol of the principal component.

A ceramic dielectrics (3) according to the present invention have a composition represented by $xMgTiO_3 \cdot (1-x)CaTiO_3 \cdot y(Nd_{1-w}Ln^2_w)_2Ti_{2z}O_{3+4z}$ (wherein $Ln^2$ is a lanthanoid, and w, x, y, and z are values in the ranges of $0 \leq w < 1$, $0.20 \leq x \leq 0.80$, $0.05 \leq y \leq 5.0$ and $0.25 \leq z \leq 1.5$, respectively.).

A ceramic dielectrics (4) according to the present invention substantially comprise a composition as a principal component represented by $xMgTiO_3 \cdot (1-x)CaTiO_3 \cdot y(Nd_{1-w}Ln^2_w)_2Ti_{2z}O_{3+4z}$ (wherein $Ln^2$ is a lanthanoid, and w, x, y, and z are values in the ranges of $0 \leq w < 1$, $0.20 \leq x \leq 0.80$, $0.05 \leq y \leq 5.0$ and $0.25 \leq z \leq 1.5$, respectively.) and ZnO and/or MnO as additives, in the range of a mol (where, $0 < a \leq 0.2$) to 1 mol of the principal component.

The above ceramic dielectrics (1)–(4) have a high relative dielectric constant ($\in_r$), 30–70, and a small dielectric loss because of a high value of Q, 3000 or more at a measuring frequency of 3 GHz, and by changing their compositions and so on, their temperature coefficient of resonant frequency ($\tau_f$) can be controlled to a particular value in the range of +100 to −100 ppm/°C.

Besides, by making use of the electric characteristics of these ceramic dielectrics (1)–(4), a resonator for high frequency signals, a filter etc. can be sharply downsized.

A method for forming a ceramic dielectrics (1) according to the present invention comprises the steps of preparing raw materials selected from compounds each of which contains one of Mg, Ca, Ti, $Ln^1$, and $Ln^2$ (here, $Ln^1$ and $Ln^2$ are lanthanoids) in such a proportion as a ceramic composition represented by $xMgTiO_3 \cdot (1-x)CaTiO_3 \cdot y(Ln^1_{1-w}Ln^2_w)_2Ti_{2z}O_{3+4z}$ (wherein $Ln^1$ and $Ln^2$ are lanthanoids, and w, x, y, and z are values in the ranges of $0 \leq w < 1$, $0.20 \leq x \leq 0.80$, $0.05 \leq y \leq 5.0$ and $0.25 \leq z \leq 1.5$, respectively.) is formed after being sintered, mixing, pressing, and then sintering the same at a temperature of 1200°–1600° C. in the air or an oxygen atmosphere.

A method for forming a ceramic dielectrics (2) according to the present invention comprises the steps of preparing raw materials selected from compounds each of which contains one of Mg, Ca, Ti, $Ln^1$, and $Ln^2$ (here, $Ln^1$ and $Ln^2$ are lanthanoids) and a powder as sintering agents selected from compounds containing Zn and/or Mn in such a proportion as a ceramic composition substantially comprising a composition as a principal component represented by $xMgTiO_3.(1-x) CaTiO_3.y(Ln^1_{1-w}Ln^2_w)_2Ti_{2z}O_{3+4z}$ (wherein $Ln^1$ and $Ln^2$ are lanthanoids, and w, x, y, and z are values in the ranges of $0 \leq w < 1$, $0.20 \leq x \leq 0.80$, $0.05 \leq y \leq 5.0$ and $0.25 \leq z \leq 1.5$, respectively.) and ZnO and/or MnO as additives in the range of a mol (where, $0 < a \leq 0.2$) to 1 mol of the principal component is formed after being sintered, mixing, pressing, and then sintering the same at a temperature of 1200°–1600° C. in the air or an oxygen atmosphere.

A method for forming a ceramic dielectrics (3) according to the present invention comprises the steps of preparing raw materials selected from compounds each of which contains one of Mg, Ca, Ti, $Ln^1$, and $Ln^2$ (here, $Ln^1$ and $Ln^2$ are lanthanoids) in such a proportion as a ceramic composition represented by $xMgTiO_3.(1-x)CaTiO_3.y(Ln^1_{1-w}Ln^2_w)_2Ti_{2z}O_{3+4z}$ (wherein $Ln^1$ and $Ln^2$ are lanthanoids, and w, x, y, and z are values in the ranges of $0 \leq w < 1$, $0.20 \leq x \leq 0.80$, $0.05 \leq y \leq 5.0$ and $0.25 \leq z \leq 1.5$, respectively.) is formed after being sintered, mixing, calcining, granulating, pressing, and then sintering the same at a temperature of 1200°–1600° C. in the air or an oxygen atmosphere.

A method for forming a ceramic dielectrics (4) according to the present invention comprises the steps of preparing raw materials selected from compounds each of which contains one of Mg, Ca, Ti, $Ln^1$, and $Ln^2$ (here, $Ln^1$ and $Ln^2$ are lanthanoids) and a powder as sintering agents selected from compounds containing Zn and/or Mn in such a proportion as a ceramic composition substantially comprising a composition as a principal component represented by $xMgTiO_3.(1-x) CaTiO_3. y(Ln^1_{1-w}Ln^2_w)_2Ti_{2z}O_{3+4z}$ (wherein $Ln^1$ and $Ln^2$ are lanthanoids, and w, x, y, and z are values in the ranges of $0 \leq w < 1$, $0.20 \leq x \leq 0.80$, $0.05 \leq y \leq 5.0$ and $0.25 \leq z \leq 1.5$, respectively.) and ZnO and/or MnO as additives in the range of a mol (where, $0 < a \leq 0.2$) to 1 mol of the principal component is formed after being sintered, mixing, calcining, granulating, pressing, and then sintering the same at a temperature of 1200°–1600° C. in the air or an oxygen atmosphere.

A method for forming ceramic dielectrics (5) according to the present invention comprises the steps of preparing raw materials selected from compounds each of which contains one of Mg, Ca, Ti, Nd, and $Ln^2$ (here, $Ln^2$ is a lanthanoid) in such a proportion as a ceramic composition represented by $xMgTiO_3.(1-x)CaTiO_3. y(Nd_{1-w}Ln^2_w)_2Ti_{2z}O_{3+4z}$ (wherein $Ln^2$ is a lanthanoid, and w, x, y, and z are values in the ranges of $0 \leq w < 1$, $0.20 \leq x \leq 0.80$, $0.05 \leq y \leq 5.0$ and $0.25 \leq z \leq 1.5$, respectively.) is formed after being sintered, mixing, calcining, granulating, pressing, and then sintering the same at a temperature of 1200°–1600° C. in the air or an oxygen atmosphere.

A method for forming a ceramic dielectrics (6) according to the present invention comprises the steps of preparing raw materials selected from compounds each of which contains one of Mg, Ca, Ti, Nd, and $Ln^2$ (here, $Ln^2$ is a lanthanoid) and a powder as sintering agents selected from compounds containing Zn and/or Mn in such a proportion as a ceramic composition substantially comprising a composition as a principal component represented by $xMgTiO_3.(1-x) CaTiO_3. y(Nd_{1-w}Ln^2_w)_2Ti_{2z}O_{3+4z}$ (wherein $Ln^2$ is a lanthanoid, and w, x, y, and z are values in the ranges of $0 \leq w < 1$, $0.20 \leq x \leq 0.80$, $0.05 \leq y \leq 5.0$ and $0.25 \leq z \leq 1.5$, respectively.) and ZnO and/or MnO as additives in the range of a mol (where, $0 < a \leq 0.2$) to 1 mol of the principal component is formed after being sintered, mixing, calcining, granulating, pressing, and then sintering the same at a temperature of 1200°–1600° C. in the air or an oxygen atmosphere.

According to the above methods for forming a ceramic dielectrics (1)–(6), a sintered body can have a uniform grain size and a ceramic dielectrics having a high relative dielectric constant ($\in_r$), 30–70, and a small dielectric loss because of a high value of Q, 3000 or more at a measuring frequency of 3 GHz, whose temperature coefficient of resonant frequency ($\tau_f$) can be controlled to a particular value in the range of +100 to −100 ppm/°C. by changing their compositions etc., can be easily manufactured.

FORM FOR CONDUCTING THE INVENTION

Figure 1:
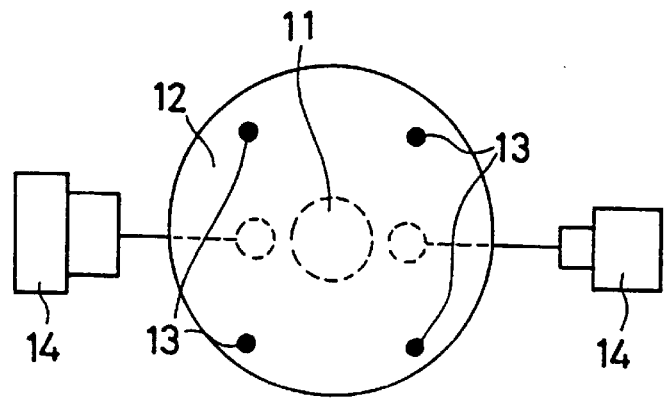
FIG. 1(a) is a diagrammatic plain figure showing an apparatus used for measuring electric characteristics of the ceramic dielectrics according to Examples in the present invention.
FIG. 1(b) is a front view thereof.
Figure 1:
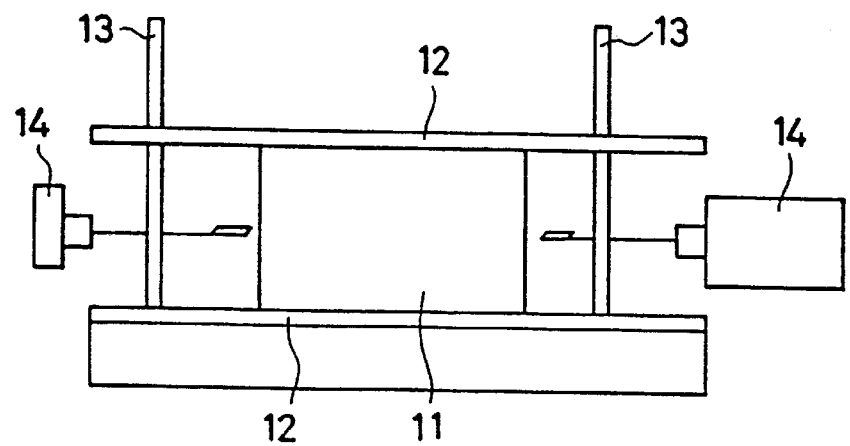

In the above methods for forming a ceramic dielectrics, raw materials are selected from compounds each of which contains one or two of Mg, Ca, Ti, and lanthanoids, and are prepared. In the case where addition of sintering agents is required, a powder selected from compounds containing Zn and Mn is added to the prepared raw materials. The compounds constituting these raw materials are not limited to oxides of the above elements and other compounds are available. For example, raw materials of carbonate, oxalate, nitrate, and alkoxide, which give oxides after being sintered, are exemplified. When oxides or carbonates of the above elements are used as raw materials, the average grain size of these compounds is preferably several $\mu$m or so. These raw materials are wet mixed in the usual way, and then dried, calcined, crushed, granulated, pressed and so on, so as to form a pressed body having a prescribed shape. After sintering the same, a ceramic is obtained.

To be concrete, every raw material is accurately weighed in the above composition, which is wet mixed with balls, a well-known dispersant and distilled water in a pot mill for 24 hours or so, and finally a raw material mixture in a slurry is obtained. Next, the mixture in a slurry is dried and crushed. Then, the crushed powder may be transferred to a zirconia crucible for sintering, be calcined and synthesized at a temperature of 1000°–1200° C., and be crushed again, depending on necessity. As for the temperature condition of calcination and synthesis, the above range of temperature is preferable, since at a temperature of less than 1000° C., a large amount of raw material is left and uniform sintering is prohibited, while at a temperature of over 1200° C., sintering starts, which makes pulverizing difficult, and in both cases the value of Q tends to decrease.

Then, the crushed powder is granulated to a powder having an almost uniform grain size. After an organic binder etc. is added to the granulated powder, a pressed body having a prescribed shape is formed. As another way, a granulation treatment may be conducted by a spray drier etc. on the crushed powder with an organic binder etc. added thereto and a pressed body may be formed from the obtained powder.

Then, the ceramic dielectric is obtained by defatting the obtained pressed body at a temperature of 600° C. or so, placing the defatted pressed body on a plate for sintering made of MgO etc., and sintering the pressed body placed thereon at a temperature of 1200°–1600° C. in the air or an oxygen atmosphere for 2–8 hours. When the sintering temperature is less than 1200° C., the pressed body is not sufficiently made fine, its value of Q becomes small, and its relative dielectric constant ($\in_r$) does not become high, while when the sintering temperature is over 1600° C., the ceramic dielectric itself becomes soft and the shape of the pressed body before being sintered cannot be kept. As a result, the above range of temperature is preferable.

The ceramic dielectrics formed by the above method have a high relative dielectric constant ($\in_r$), 30–70, and a large value of Q, 3000 or more at a measuring frequency of 3 GHz. In addition, it is possible to control its temperature coefficient of resonant frequency ($\tau_f$) to a particular value in the range of +100 to −100 ppm/°C. by changing x, y etc. in the composition formula. And the tissue structure of the ceramic dielectrics has an almost uniform grain size and is extremely fine, having a sintering density of 96.0–100% or so to the theoretical density, and is excellent in mechanical characteristics, so that it is suitable for use for a resonator or the like.

In the ceramic dielectrics, $Ln^1$ and $Ln^2$ are rare earth lanthanoid elements, and as the elements, La, Ce, Nd, Gd, Sm, and Dy are exemplified. As mentioned before, the temperature coefficient of resonant frequency ($\tau_f$) can be controlled by changing the mixing ratio of these lanthanoids (y).

X is an atom ratio of Mg to a total amount of Mg and Ca in the ceramic dielectrics. When x is less than 0.20, Q becomes small, 3000 or less (at 3 GHz), and the temperature coefficient of resonant frequency ($\tau_f$) becomes larger than 100, while when x is over 0.80, the relative dielectric constant ($\in_r$) becomes small, less than 30.

Y is a mol ratio of $(Ln^1_{1-w}Ln^2_w)_2 Ti_{2z}O_{3+4z}$ to $(xMgTiO_3+(1-x)CaTiO_3)$. When y is less than 0.05, the temperature coefficient of resonant frequency ($\tau_f$) becomes too large, while when y is over 5.0, Q becomes small, 3000 or less.

Z is a mol ratio of Ti to lanthanoids. When z is less than 0.25, Q becomes small, 3000 or less, while when z is over 1.5, the temperature coefficient of resonant frequency ($\tau_f$) becomes too large.

A is mols of sintering agents to 1 mol of the principal component. The sintering agents contribute to a rise in Q when it is added in the case where sintering is difficult because of a small amount of Ti. On the other hand, the temperature coefficient of resonant frequency ($\tau_f$) becomes small by adding the sintering agents. When a is over 0.20, Q becomes small, 3000 or less.

DESCRIPTION OF PREFERRED EMBODIMENTS

Examples and Comparative Examples of a ceramic dielectric and a method for forming the same according to the present invention are described below.

First, a method for forming ceramic dielectrics according to Examples is explained.

Raw materials selected from MgO, $CaCo_3$, $TiO_2$, $Ln^1_2O_3$, and $Ln^2_2O_3$ ($Ln^1$ and $Ln^2$ are lanthanoids), having an average grain size of some $\mu$m, were prepared in the proportions shown in Tables 1–5. Here, w, x, y, 2z, and a in Tables 1–5 correspond to the letters representing the ceramic dielectrics (1) and (2). In addition, as sintering agents, ZnO and $MnCO_3$ having the same average grain size as them were used.

A method for forming a sintered body is as described in the "FORM FOR CONDUCTING THE INVENTION", and as a raw material for pressing, powder calcined at 1000° C., and then crushed and granulated by addition of an organic binder etc. were used.

As for the composition of the ceramic dielectrics obtained by the above sintering, by conducting an ICP emission spectrochemical analysis after the ceramic dielectric was dissolved in an acid, it was confirmed that the composition of the sintered body is the same as the preparation composition of the raw materials. For further observation of the structure of the sintered body, an etching treatment was conducted on the sintered body after being broken, and the surface thereof was observed with a scanning electron microscope (SEM). As a result, it was proved that the ceramic dielectrics according to Examples have a fine structure formed from particles having an almost uniform grain size.

And in order for measuring electric characteristics, a sample for the measurement of electric characteristics was formed by sufficiently washing the obtained sintered body in distilled water, and then polishing it into such a shape as it has parallel main surfaces and a resonant frequency of 3 GHz.

Next, a method for measuring electric characteristics of the ceramic dielectrics according to Examples is explained.

As the electric characteristics, the resonant frequency, relative dielectric constant ($\in_r$) and Q were measured by the Hakki-Coleman dielectric resonator method.

FIG. 1(a) is a plain figure diagrammatically showing an apparatus used for measuring the electric characteristics, and FIG. 1(b) is a front view thereof.

A sample (ceramic dielectric) 11, a subject of the measurement, is fixed in the state of being interposed between two parallel metal plates 12. 13 represents a column for keeping the metal plate stable on the sample.

In measuring the dielectric constant, the frequency characteristic was measured by oscillating a high frequency from a probe 14 of a network analyzer, and the relative dielectric constant ($\in_r$) was calculated from the obtained resonant frequency peak in TEO1 δ mode and the dimensions of a sample 11. As for measuring Q, the surface specific resistance of a metal plate 12 was found by using a standard sample, from which the dielectric loss for a metal plate 12 was found, and Q of a sample 11 was calculated by subtracting the dielectric loss for a metal plate 12 from the total dielectric loss. And the temperature coefficient of resonant frequency ($\tau_f$) was measured in the atmospheric temperature range from −30° to +85° C.

As the samples for the measurement, fifty samples of every Example (composition) were manufactured and the electric characteristics of each sample 11 were measured, and average values thereof were calculated. The results are shown in Tables 1–5.

Here, as Comparative Examples, the electric characteristics of the ceramic dielectrics having a composition outside the range of the present invention, manufactured under the same conditions as Examples, and those of the ceramic dielectrics having a composition within the range of the present invention, manufactured at a sintering temperature of less than 1200° C. or more than 1600° C., were measured. The results are also shown in Tables 1–5. Comparative Examples are marked *.

TABLE 1

| Sample No. | Composition of Ceramic Dielectrics | | | | | | Sintering Tempera-ture (°C.) | Relative Dielectric Constant ($\epsilon_r$) | Value of Q (at 3 GHz) | Temperature Coefficient $\tau^f$ (ppm/°C.) | Note |
|---|---|---|---|---|---|---|---|---|---|---|---|
| | x | $Ln^1$ (w = 0) | y | 2z | Sintering Agent | a | | | | | |
| 1 | 0.900 | Nd | 0.150 | 1.000 | | 0.000 | 1400 | 20 | 50000 | −15 | * |
| 2 | 0.800 | Nd | 0.150 | 1.000 | | 0.000 | 1400 | 32 | 11000 | 9 | |
| 3 | 0.700 | Nd | 0.150 | 1.000 | | 0.000 | 1400 | 42 | 8000 | 18 | |
| 4 | 0.600 | Nd | 0.150 | 1.000 | | 0.000 | 1400 | 56 | 7300 | 31 | |
| 5 | 0.500 | Nd | 0.150 | 1.000 | | 0.000 | 1400 | 62 | 6500 | 48 | |
| 6 | 0.400 | Nd | 0.150 | 1.000 | | 0.000 | 1400 | 67 | 6200 | 56 | |
| 7 | 0.300 | Nd | 0.150 | 1.000 | | 0.000 | 1400 | 69 | 6000 | 71 | |
| 8 | 0.200 | Nd | 0.150 | 1.000 | | 0.000 | 1400 | 70 | 4700 | 85 | |
| 9 | 0.100 | Nd | 0.150 | 1.000 | | 0.000 | 1400 | 71 | 1800 | 101 | * |
| 10 | 0.500 | Nd | 0.000 | 1.000 | | 0.000 | 1400 | 72 | 1500 | 125 | * |
| 11 | 0.500 | Nd | 0.005 | 1.000 | | 0.000 | 1400 | 69 | 3200 | 117 | * |
| 12 | 0.500 | Nd | 0.040 | 1.000 | | 0.000 | 1400 | 68 | 1100 | 111 | * |
| 13 | 0.500 | Nd | 0.050 | 1.000 | | 0.000 | 1400 | 67 | 3800 | 63 | |
| 14 | 0.500 | Nd | 0.250 | 1.000 | | 0.000 | 1400 | 58 | 6300 | 40 | |
| 15 | 0.500 | Nd | 0.500 | 1.000 | | 0.000 | 1400 | 52 | 6000 | 37 | |
| 16 | 0.500 | Nd | 1.000 | 1.000 | | 0.000 | 1400 | 49 | 6700 | 19 | |
| 17 | 0.500 | Nd | 1.500 | 1.000 | | 0.000 | 1400 | 46 | 6600 | 6 | |
| 18 | 0.500 | Nd | 2.500 | 1.000 | | 0.000 | 1400 | 39 | 3500 | −10 | |
| 19 | 0.500 | Nd | 5.000 | 1.000 | | 0.000 | 1400 | 45 | 6000 | −15 | |
| 20 | 0.500 | Nd | 5.300 | 1.000 | | 0.000 | 1400 | 35 | 1000 | — | * |
| 21 | 0.500 | Sm | 0.005 | 1.000 | | 0.000 | 1400 | 63 | 5700 | 109 | * |
| 22 | 0.500 | Sm | 0.040 | 1.000 | | 0.000 | 1400 | 56 | 2300 | 105 | * |
| 23 | 0.500 | Sm | 0.050 | 1.000 | | 0.000 | 1400 | 58 | 5200 | 62 | |
| 24 | 0.500 | Sm | 0.500 | 1.000 | | 0.000 | 1400 | 50 | 5900 | 38 | |
| 25 | 0.500 | Sm | 1.000 | 1.000 | | 0.000 | 1400 | 47 | 6200 | 18 | |
| 26 | 0.500 | Sm | 1.500 | 1.000 | | 0.000 | 1400 | 42 | 5900 | −15 | |
| 27 | 0.500 | Sm | 2.500 | 1.000 | | 0.000 | 1400 | 31 | 3800 | −24 | |
| 28 | 0.500 | Sm | 5.000 | 1.000 | | 0.000 | 1400 | 30 | 3500 | −15 | |
| 29 | 0.500 | Sm | 5.300 | 1.000 | | 0.000 | 1400 | 24 | 1500 | — | * |

TABLE 2

| Sample No. | Composition of Ceramic Dielectrics | | | | | | Sintering Tempera-ture (°C.) | Relative Dielectric Constant ($\epsilon_r$) | Value of Q (at 3 GHz) | Temperature Coefficient $\tau^f$ (ppm/°C.) | Note |
|---|---|---|---|---|---|---|---|---|---|---|---|
| | x | $Ln^1$ (w = 0) | y | 2z | Sintering Agent | a | | | | | |
| 30 | 0.500 | Gd | 0.005 | 1.000 | | 0.000 | 1400 | 61 | 1800 | 105 | * |
| 31 | 0.500 | Gd | 0.040 | 1.000 | | 0.000 | 1400 | 60 | 1500 | 135 | * |
| 32 | 0.500 | Gd | 0.050 | 1.000 | | 0.000 | 1400 | 56 | 4300 | 60 | |
| 33 | 0.500 | Gd | 0.500 | 1.000 | | 0.000 | 1400 | 49 | 4900 | 37 | |
| 34 | 0.500 | Gd | 1.000 | 1.000 | | 0.000 | 1400 | 45 | 5700 | 10 | |
| 35 | 0.500 | Gd | 1.500 | 1.000 | | 0.000 | 1400 | 41 | 7200 | 21 | |
| 36 | 0.500 | Gd | 2.500 | 1.000 | | 0.000 | 1400 | 31 | 3200 | 35 | |
| 37 | 0.500 | Gd | 5.000 | 1.000 | | 0.000 | 1400 | 30 | 3700 | −35 | |
| 38 | 0.500 | Gd | 5.300 | 1.000 | | 0.000 | 1400 | 20 | 1300 | 40 | * |
| 39 | 0.500 | Dy | 0.005 | 1.000 | | 0.000 | 1400 | 60 | 1300 | 104 | * |
| 40 | 0.500 | Dy | 0.040 | 1.000 | | 0.000 | 1400 | 57 | 500 | 120 | * |
| 41 | 0.500 | Dy | 0.050 | 1.000 | | 0.000 | 1400 | 55 | 4900 | 58 | |
| 42 | 0.500 | Dy | 0.500 | 1.000 | | 0.000 | 1400 | 48 | 5500 | 36 | |
| 43 | 0.500 | Dy | 1.000 | 1.000 | | 0.000 | 1400 | 44 | 6200 | 10 | |
| 44 | 0.500 | Dy | 1.500 | 1.000 | | 0.000 | 1400 | 40 | 6100 | −23 | |
| 45 | 0.500 | Dy | 2.500 | 1.000 | | 0.000 | 1400 | 34 | 3200 | −61 | |
| 46 | 0.500 | Dy | 5.000 | 1.000 | | 0.000 | 1400 | 30 | 3200 | −47 | |
| 47 | 0.500 | Dy | 5.300 | 1.000 | | 0.000 | 1400 | 27 | 1800 | — | * |
| 48 | 0.500 | Ce | 0.005 | 1.000 | | 0.000 | 1400 | 70 | 1300 | 121 | * |
| 49 | 0.500 | Ce | 0.050 | 1.000 | | 0.000 | 1400 | 68 | 3900 | 65 | |
| 50 | 0.500 | Ce | 0.500 | 1.000 | | 0.000 | 1400 | 59 | 4300 | 42 | |
| 51 | 0.500 | Ce | 1.000 | 1.000 | | 0.000 | 1400 | 53 | 5100 | 21 | |
| 52 | 0.500 | Ce | 1.500 | 1.000 | | 0.000 | 1400 | 45 | 4200 | 4 | |
| 53 | 0.500 | Ce | 2.500 | 1.000 | | 0.000 | 1400 | 33 | 4000 | −15 | |
| 54 | 0.500 | Nd | 0.150 | 1.000 | MnO | 0.010 | 1400 | 51 | 6600 | 49 | |
| 55 | 0.500 | Nd | 0.150 | 1.000 | MnO | 0.100 | 1400 | 50 | 6500 | 47 | |
| 56 | 0.500 | Nd | 0.150 | 1.000 | MnO | 0.180 | 1400 | 55 | 6800 | 40 | |
| 57 | 0.500 | Nd | 0.150 | 1.000 | MnO | 0.210 | 1400 | — | — | — | * |
| 58 | 0.500 | Nd | 0.150 | 1.000 | ZnO | 0.010 | 1400 | 60 | 6900 | 47 | |
| 59 | 0.500 | Nd | 0.150 | 1.000 | ZnO | 0.100 | 1400 | 58 | 7000 | 45 | |

TABLE 2-continued

| Sample No. | Composition of Ceramic Dielectrics | | | | | | Sintering Temperature (°C.) | Relative Dielectric Constant ($\epsilon_r$) | Value of Q (at 3 GHz) | Temperature Coefficient $\tau^f$ (ppm/°C.) | Note |
|---|---|---|---|---|---|---|---|---|---|---|---|
| | x | $Ln^1$ (w = 0) | y | 2z | Sintering Agent | a | | | | | |
| 60 | 0.500 | Nd | 0.150 | 1.000 | ZnO | 0.180 | 1400 | 53 | 7200 | 39 | |
| 61 | 0.500 | Nd | 0.150 | 1.000 | ZnO | 0.210 | 1400 | — | 800 以下 | — | * |

TABLE 3

| Sample No. | Composition of Ceramic Dielectrics | | | | | | Sintering Temperature (°C.) | Relative Dielectric Constant ($\epsilon_r$) | Value of Q (at 3 GHz) | Temperature Coefficient $\tau^f$ (ppm/°C.) | Note |
|---|---|---|---|---|---|---|---|---|---|---|---|
| | x | $Ln^1$ (w = 0) | y | 2z | Sintering Agent | a | | | | | |
| 62 | 0.500 | Nd | 0.150 | 0.400 | | 0.000 | 1400 | 28 | 1600 | 35 | * |
| 63 | 0.500 | Nd | 0.150 | 0.500 | | 0.000 | 1400 | 60 | 6400 | 21 | |
| 64 | 0.500 | Nd | 0.150 | 0.750 | | 0.000 | 1400 | 61 | 6700 | 50 | |
| 65 | 0.500 | Nd | 0.150 | 1.250 | | 0.000 | 1400 | 64 | 6500 | 40 | |
| 66 | 0.500 | Nd | 0.150 | 1.500 | | 0.000 | 1400 | 62 | 5200 | 39 | |
| 67 | 0.500 | Nd | 0.150 | 2.000 | | 0.000 | 1400 | 63 | 5400 | 37 | |
| 68 | 0.500 | Nd | 0.150 | 3.100 | | 0.000 | 1400 | 76 | 4600 | 135 | * |
| 69 | 0.500 | Nd | 0.150 | 1.000 | | 0.000 | 1100 | 23 | 800 以下 | — | * |
| 70 | 0.500 | Nd | 0.150 | 1.000 | | 0.000 | 1150 | 27 | 900 | — | * |
| 71 | 0.500 | Nd | 0.150 | 1.000 | | 0.000 | 1200 | 60 | 6000 | 41 | |
| 72 | 0.500 | Nd | 0.150 | 1.000 | | 0.000 | 1300 | 61 | 5700 | 47 | |
| 73 | 0.500 | Nd | 0.150 | 1.000 | | 0.000 | 1500 | 62 | 6200 | 48 | |
| 74 | 0.500 | Nd | 0.150 | 1.000 | | 0.000 | 1600 | 63 | 5600 | 49 | |
| 75 | 0.500 | Nd | 0.150 | 1.000 | | 0.000 | 1650 | unmeasured owing to dissolution | | | * |
| 76 | 0.500 | Nd | 0.150 | 1.000 | MnO | 0.100 | 1150 | 29 | 1100 | 47 | * |
| 77 | 0.500 | Nd | 0.150 | 1.000 | MnO | 0.100 | 1200 | 60 | 6500 | 41 | |
| 78 | 0.500 | Nd | 0.150 | 1.000 | MnO | 0.100 | 1300 | 60 | 6000 | 41 | |
| 79 | 0.500 | Nd | 0.150 | 1.000 | ZnO | 0.100 | 1150 | 27 | 900 | 44 | * |
| 80 | 0.500 | Nd | 0.150 | 1.000 | ZnO | 0.100 | 1200 | 59 | 6800 | 46 | |
| 81 | 0.500 | Nd | 0.150 | 1.000 | ZnO | 0.100 | 1300 | 60 | 7100 | 47 | |
| 82 | 0.500 | La | 0.150 | 1.000 | | 0.000 | 1400 | 70 | 4900 | 93 | |
| 83 | 0.500 | La | 0 | 1.000 | | 0.000 | 1400 | 57 | 3400 | 800 | * |
| 84 | 0.500 | La | 0.001 | 1.000 | | 0.000 | 1400 | 61 | 3900 | 148 | * |
| 85 | 0.500 | La | 0.010 | 1.000 | | 0.000 | 1400 | 52 | 4200 | 125 | * |
| 86 | 0.500 | La | 0.100 | 1.000 | | 0.000 | 1400 | 49 | 4300 | 69 | |
| 87 | 0.500 | La | 1.000 | 1.000 | | 0.000 | 1400 | 51 | 4700 | 63 | |
| 88 | 0.500 | La | 3.000 | 1.000 | | 0.000 | 1400 | 47 | 3500 | 21 | |
| 89 | 0.500 | La | 4.900 | 1.000 | | 0.000 | 1400 | 43 | 3400 | 11 | |
| 90 | 0.500 | La | 5.500 | 1.000 | | 0.000 | 1400 | 41 | 360 | −100 | * |
| 91 | 0.700 | La | 0.500 | 1.000 | | 0.000 | 1400 | 64 | 6300 | 93 | |
| 92 | 0.700 | La | 2.500 | 1.000 | | 0.000 | 1400 | 59 | 3800 | 19 | |
| 93 | 0.700 | La | 6.000 | 1.000 | | 0.000 | 1400 | 43 | 560 | 0 | * |
| 94 | 1.000 | La | 3.000 | 1.000 | | 0.000 | 1400 | 85 | 490 | 490 | * |
| 95 | 1.000 | La | 6.000 | 1.000 | | 0.000 | 1400 | 47 | 300 | 580 | * |

TABLE 4

| Sample No. | Composition of Ceramic Dielectrics | | | | | | | Sintering Temperature (°C.) | Relative Dielectric Constant ($\epsilon_r$) | Value of Q (at 3 GHz) | Temperature Coefficient $\tau^f$ (ppm/°C.) | Note |
|---|---|---|---|---|---|---|---|---|---|---|---|---|
| | x | $Ln^1$ $Ln^2$ | w | y | 2z | Sintering Agents | a | | | | | |
| 96 | 0.500 | Nd Sm | 0.500 | 0.500 | 1.000 | | 0.000 | 1400 | 63 | 4800 | 62 | |
| 97 | 0.500 | Nd Gd | 0.500 | 0.500 | 1.000 | | 0.000 | 1400 | 60 | 4100 | 61 | |
| 98 | 0.500 | Nd Dy | 0.500 | 0.500 | 1.000 | | 0.000 | 1400 | 60 | 4200 | 60 | |
| 99 | 0.500 | Nd Ce | 0.500 | 0.500 | 1.000 | | 0.000 | 1400 | 67 | 3600 | 64 | |
| 100 | 0.500 | Sm | 0.500 | 0.500 | 1.000 | | 0.000 | 1400 | 58 | 4900 | 61 | |

TABLE 4-continued

| Sample No. | x | Ln¹ Ln² | w | y | 2z | Sintering Agents | a | Sintering Temperature (°C.) | Relative Dielectric Constant ($\epsilon_r$) | Value of Q (at 3 GHz) | Temperature Coefficient $\tau^f$ (ppm/°C.) | Note |
|---|---|---|---|---|---|---|---|---|---|---|---|---|
| 101 | 0.500 | Gd Sm | 0.500 | 0.500 | 1.000 | | 0.000 | 1400 | 60 | 4200 | 60 | |
| 102 | 0.500 | Dy Sm | 0.500 | 0.500 | 1.000 | | 0.000 | 1400 | 57 | 4200 | 63 | |
| 103 | 0.500 | Ce Sm | 0.500 | 0.500 | 1.000 | | 0.000 | 1400 | 51 | 4500 | 59 | |
| 104 | 0.500 | Dy Gd | 0.500 | 0.500 | 1.000 | | 0.000 | 1400 | 60 | 4000 | 63 | |
| 105 | 0.500 | Ce Dy | 0.500 | 0.500 | 1.000 | | 0.000 | 1400 | 61 | 4200 | 51 | |
| 106 | 0.500 | Ce Nd | 0.010 | 0.500 | 1.000 | | 0.000 | 1400 | 52 | 10000 | 25 | |
| 107 | 0.500 | Nd La | 0.100 | 0.500 | 1.000 | | 0.000 | 1400 | 56 | 11500 | 25 | |
| 108 | 0.500 | Nd La | 0.200 | 0.500 | 1.000 | | 0.000 | 1400 | 59 | 12100 | 37 | |
| 109 | 0.500 | Nd La | 0.300 | 0.500 | 1.000 | | 0.000 | 1400 | 61 | 11300 | 44 | |
| 110 | 0.500 | Nd La | 0.400 | 0.500 | 1.000 | | 0.000 | 1400 | 64 | 10800 | 56 | |
| 111 | 0.500 | Nd La | 0.500 | 0.500 | 1.000 | | 0.000 | 1400 | 66 | 9700 | 63 | |

TABLE 5

| Sample No. | x | Ln¹ Ln² | w | y | 2z | Sintering Agents | a | Sintering Temperature (°C.) | Relative Dielectric Constant ($\epsilon_r$) | Value of Q (at 3 GHz) | Temperature Coefficient $\tau^f$ (ppm/°C.) | Note |
|---|---|---|---|---|---|---|---|---|---|---|---|---|
| 112 | 0.500 | Nd La | 0.600 | 0.500 | 1.000 | | 0.000 | 1400 | 66 | 8300 | 65 | |
| 113 | 0.500 | Nd La | 0.700 | 0.500 | 1.000 | | 0.000 | 1400 | 68 | 5200 | 73 | |
| 114 | 0.500 | Nd La | 0.800 | 0.500 | 1.000 | | 0.000 | 1400 | 69 | 5000 | 77 | |
| 115 | 0.500 | Nd La | 0.900 | 0.500 | 1.000 | | 0.000 | 1400 | 70 | 4800 | 91 | |
| 116 | 0.500 | Nd La | 0.500 | 0 | 1.000 | | 0.000 | 1400 | 56 | 3500 | 780 | * |
| 117 | 0.500 | Nd La | 0.500 | 0.001 | 1.000 | | 0.000 | 1400 | 57 | 4100 | 190 | * |
| 118 | 0.500 | Nd La | 0.500 | 0.010 | 1.000 | | 0.000 | 1400 | 55 | 5100 | 160 | * |
| 119 | 0.500 | Nd La | 0.500 | 0.100 | 1.000 | | 0.000 | 1400 | 54 | 4100 | 71 | |
| 120 | 0.500 | Nd La | 0.500 | 1.000 | 1.000 | | 0.000 | 1400 | 49 | 4300 | 53 | |
| 121 | 0.500 | Nd La | 0.500 | 3.000 | 1.000 | | 0.000 | 1400 | 46 | 3900 | 18 | |
| 122 | 0.500 | Nd La | 0.500 | 4.500 | 1.000 | | 0.000 | 1400 | 43 | 3300 | −3 | |
| 123 | 0.500 | Nd La | 0.500 | 5.500 | 1.000 | | 0.000 | 1400 | 35 | 870 | −105 | * |
| 124 | 0.700 | Nd La | 0.500 | 0.500 | 1.000 | | 0.000 | 1400 | 65 | 6900 | 78 | |
| 125 | 0.700 | Nd La | 0.500 | 4.500 | 1.000 | | 0.000 | 1400 | 46 | 3300 | 11 | |
| 126 | 0.700 | Nd La | 0.500 | 6.000 | 1.000 | | 0.000 | 1400 | 44 | 950 | 8 | * |

As obvious from the results in Tables 1–5, the ceramic dielectrics according to Examples have a high relative dielectric constant ($\epsilon_r$), 30–70, and a small dielectric loss because of a large value of Q, 3000 or more at a measuring frequency of 3 GHz, and the temperature coefficient of resonant frequency ($\tau_f$) can be controlled to be a particular value within the range of +100° to −100 ppm/°C. by changing the ratio (x) of MgO to CaO, or the ratio (y) of ($xMgTiO_3 \cdot (1-x)CaTiO_3$) to $(Ln^1_{1-w}Ln^2_w)_2Ti_{2z}O_{3+4z}$. And by setting the sintering temperature at a temperature of 1200°–1600° C., a ceramic dielectrics having the above excellent electric characteristics can be manufactured.

On the other hand, among the ceramic dielectrics according to Comparative Examples, those having x of less than 0.20 or more than 0.80, y of less than 0.05 or more than 5.0, z of less than 0.25 or more than 1.5, and a of more than 0.2, had at least one of Q, relative dielectric constant ($\in_r$) and temperature coefficient of resonant frequency ($\tau_f$) outside the above ranges. As a result, it is difficult to use them as a material for a resonator, a filter or the like.

And as for the ceramic dielectrics formed at a sintering temperature of less than 1200° C. or more than 1600° C., the obtained electric characteristics thereof were not desirable, either.

POSSIBILITY OF INDUSTRIAL APPLICATION

Ceramic dielectrics according to the present invention can be used as a material for a high-performance resonator processing a signal in the microwave-bandwidth, a filter, a capacitor or the like.

I claim:

1. A ceramic dielectric consisting essentially of $xMgTiO_3 \cdot (1-x)CaTiO_3 \cdot y(Ln^1_{1-w}Ln^2_w)_2Ti_{2z}O_{3+4z}$, wherein $Ln^1$ and $Ln^2$ are lanthanoids and w, x, y, and z are values in the range of $0 \leq w < 1$, $0.20 \leq x \leq 0.80$, $0.1 \leq y \leq 5.0$, and $0.25 \leq z \leq 1.5$, respectively.

2. A ceramic dielectric consisting essentially of $xMgTiO_3 \cdot (1-x)CaTiO_3 \cdot y(Ln^1_{1-w}Ln^2_w)_2Ti_{2z}O_{3+4z}$, wherein $Ln^1$ and $Ln^2$ are lanthanoids and w, x, y, and z are values in the range of $0 \leq w < 1$, $0.20 \leq x \leq 0.80$, $0.05 \leq y \leq 5.0$, and $0.25 \leq z \leq 1.5$, respectively and ZnO and/or MnO as additives in the range of a to 1 mol of the principal component, where the value of a is $0 < a \leq 0.2$.

3. A ceramic dielectric consisting essentially of $xMgTiO_3 \cdot (1-x)CaTiO_3 \cdot y(Nd_{1-w}Ln^2_w)_2Ti_{2z}O_{3+4z}$, wherein $Ln^2$ is a lanthanoid and w, x, y, and z are values in the range of $0 \leq w < 1$, $0.20 \leq x \leq 0.80$, $0.1 \leq y \leq 5.0$, and $0.25 \leq z \leq 1.5$, respectively.

4. A ceramic dielectric consisting essentially of $xMgTiO_3 \cdot (1-x)CaTiO_3 \cdot y(Nd_{1-w}Ln^2_w)_2Ti_{2z}O_{3+4z}$, wherein $Ln^2$ is a lanthanoid and w, x, y, and z are values in the range of $0 \leq w < 1$, $0.20 \leq x \leq 0.80$, $0.05 \leq y \leq 5.0$, and $0.25 \leq z \leq 1.5$, respectively and ZnO and/or MnO as additives in the range of a to 1 mol of the principal component, where the value of a is $0 < a \leq 0.2$.

5. A method for forming ceramic dielectrics, comprising the steps of preparing raw materials selected from compounds each of which contains one of Mg, Ca, Ti, $Ln^1$, and $Ln^2$, wherein $Ln^1$ and $Ln^2$ are lanthanoids in such ceramic dielectrics after being sintered consisting essentially of $xMgTiO_3 \cdot (1-x)CaTiO_3 \cdot y(Ln^1_{1-w}Ln^2_w)_2Ti_{2z}O_{3+4z}$, wherein $Ln^1$ and $Ln^2$ are lanthanoids and w, x, y, and z are values in the ranges of $0 \leq w < 1$, $0.20 \leq x \leq 0.80$, $0.01 \leq y \leq 5.0$, and $0.25 \leq z \leq 1.5$, respectively, mixing, pressing, and then sintering the same at a temperature of 1200°–1600° C. in air or an oxygen atmosphere.

6. A method for forming ceramic dielectrics, comprising the steps of preparing raw materials selected from compounds each of which contains one of Mg, Ca, Ti, $Ln^1$, and $Ln^2$, wherein $Ln^1$ and $Ln^2$ are lanthanoids, and a powder as sintering agents selected from compounds containing Zn and/or Mn in such ceramic dielectrics after being sintered consisting essentially of $xMgTiO_3 \cdot (1-x)CaTiO_3 \cdot y(Ln^1_{1-w}Ln^2_w)_2Ti_{2z}O_{3+4z}$, wherein $Ln^1$ and $Ln^2$ are lanthanoids and w, x, y, and z are values in the ranges of $0 \leq w < 1$, $0.20 \leq x \leq 0.80$, $0.05 \leq y \leq 5.0$, and $0.25 \leq z \leq 1.5$, respectively, and ZnO and/or MnO as additives in the range of a to 1 mol of the principal component, where the value of a is $0 < a \leq 0.2$, mixing, pressing, and then sintering the same at a temperature of 1200°–1600° C. in air or an oxygen atmosphere.

7. A method for forming ceramic dielectrics, comprising the steps of preparing raw materials selected from compounds each of which contains one of Mg, Ca, Ti, $Ln^1$, and $Ln^2$, wherein $Ln^1$ and $Ln^2$ are lanthanoids, and a powder as sintering agents selected from compounds containing Zn and/or Mn in such ceramic dielectrics after being sintered consisting essentially of $xMgTiO_3 \cdot (1-x)CaTiO_3 \cdot y(Ln^1_{1-w}Ln^2_w)_2Ti_{2z}O_{3+4z}$, wherein $Ln^1$ and $Ln^2$ are lanthanoids and w, x, y, and z are values in the ranges of $0 \leq w < 1$, $0.20 \leq x \leq 0.80$, $0.1 \leq y \leq 5.0$, and $0.25 \leq z \leq 1.5$, respectively, and ZnO and/or MnO as additives in the range of a to 1 mol of the principal component, where the value of a is 021 $a \leq 0.2$, is formed after being sintered, mixing, pressing, and then sintering the same at a temperature of 1200°–1600° C. in air or an oxygen atmosphere.

8. A method for forming ceramic dielectrics, comprising the steps of preparing raw materials selected from compounds each of which contains one of Mg, Ca, Ti $Ln^1$, and $Ln^2$, wherein $Ln^1$ and $Ln^2$ are lanthanoids, and a powder as sintering agents selected from compounds containing Zn and/or Mn in such ceramic dielectrics after being sintered consisting essentially of $xMgTiO_3 \cdot (1-x)CaTiO_3 \cdot y(Ln^1_{1-w}Ln^2_w)_2Ti_{2z}O_{3+4z}$, wherein $Ln^1$ and $Ln^2$ are lanthanoids and w, x, y, and z are values in the ranges of $0 \leq w < 1$, $0.20 \leq x \leq 0.80$, $0.05 \leq y \leq 5.0$, and $0.25 \leq z \leq 1.5$, respectively, and ZnO and/or MnO as additives in the range of a to 1 mol of the principal component, where the value of a is $0 < a \leq 0.2$, is formed after being sintered, mixing, calcining, granulating, pressing, and then sintering the same at a temperature of 1200°–1600° C. in air or an oxygen atmosphere.

9. A method for forming ceramic dielectrics, comprising the steps of preparing raw materials selected from compounds each of which contains one of Mg, Ca, Ti, Nd, and $Ln^2$, wherein $Ln^2$ is a lanthanoid, and a powder as sintering agents selected from compounds containing Zn and/or Mn in such ceramic dielectrics after being sintered consisting essentially of $xMgTiO_3 \cdot (1-x)CaTiO_3 \cdot y(Nd_{1-w}Ln^2_w)_2Ti_{2z}O_{3+4z}$, wherein $Ln^2$ is a lanthanoid and w, x, y, and z are values in the ranges of $0 \leq w < 1$, $0.20 \leq x \leq 0.80$, $0.1 \leq y \leq 5.0$, and $0.25 \leq z \leq 1.5$, respectively, and ZnO and/or MnO as additives in the range of a to 1 mol of the principal component, where the value of a is $0 < a \leq 0.2$, mixing, calcining, granulating, pressing, and then sintering the same at a temperature of 1200°–1600° C. in air or an oxygen atmosphere.

10. A method for forming ceramic dielectrics, comprising the steps of preparing raw materials selected from compounds each of which contains one of Mg, Ca, Ti, Nd, and $Ln^2$, wherein $Ln^2$ is a lanthanoid, and a powder as sintering agents selected from compounds containing Zn and/or Mn in such ceramic dielectrics after being sintered consisting essentially of $xMgTiO_3 \cdot (1-x)CaTiO_3 \cdot y(Nd_{1-w}Ln^2_w)_2Ti_{2z}O_{3+4z}$, wherein $Ln^2$ is a lanthanoid and w, x, y, and z are values in the ranges of $0 \leq w < 1$, $0.20 \leq x \leq 0.80$, $0.05 \leq y \leq 5.0$, and $0.25 \leq z \leq 1.5$, respectively, and ZnO and/or MnO as additives in the range of a to 1 mol of the principal component, where the value of a is $0 < a \leq 0.2$, is formed after being sintered, mixing, calcining, granulating, pressing, and then sintering the same at a temperature of 1200°–1600° C. in air or an oxygen atmosphere.

\* \* \* \* \*